Figure 1:
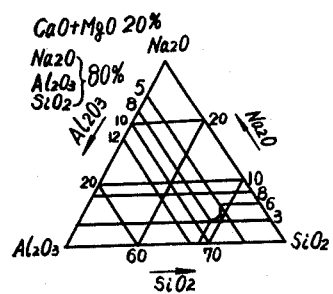

Feb. 23, 1965 TOSHIO TAKEHARA ETAL 3,170,780
METHOD OF MANUFACTURING PORCELAIN ARTICLES
BY CRYSTALLIZING GLASS MATERIALS
Filed Feb. 26, 1963

INVENTORS
Toshio Takehara
Akihiro Tsuji
BY Stevens, Davis, Miller + Mosher
ATTORNEYS они
United States Patent Office 3,170,780
Patented Feb. 23, 1965

3,170,780
METHOD OF MANUFACTURING PORCELAIN ARTICLES BY CRYSTALLIZING GLASS MATERIALS
Toshio Takehara, Mizuho-ku, Nagoya, and Akihiro Tsuji, Gifu, Japan, assignors to NGK Insulators, Ltd., Nagoya, Japan, a corporation of Japan
Filed Feb. 26, 1963, Ser. No. 261,064
Claims priority, application Japan, Mar. 2, 1962, 37/8,037; Mar. 19, 1962, 37/10,799
2 Claims. (Cl. 65—19)

The present invention relates to a method of manufacturing porcelain articles by crystallizing glass materials containing zinc sulfide.

The principal object of the invention is to provide high strength crystallized glass porcelain articles easily at a low cost.

Another object of the invention is to provide a crystallized glass article which can be shaped comparatively easy to a desired form.

In case of manufacturing porcelain articles by crystallizing glass materials it is necessary to previously add nucleating agent for forming a nucleus of the crystal to the glass composition or to use a special composition which crystallizes without nucleus. As nucleating agents the following materials may be utilized: light sensitive metals, such as gold, silver, copper etc., precious metals, such as platinum, ruthenium, palladium and the like or oxides thereof, such as $TiO_2$, $P_2O_5$, $ZrO_2$ and the like. As the compositions not requiring nucleating agents there are $Li_2O$-$MgO$-$Al_2O_3$-$SiO_2$ compounds and $Li_2O$-$ZnO$-$Al_2O_3$-$SiO_2$ compounds containing large quantity of MgO and ZnO respectively as well as compositions for Bon-china.

Among these materials except a part of $TiO_2$ nucleus and the Bon-china compositions, all the remainings are of alkaline source and $LiO_2$ constitutes the essential ingredients though there is some difference, that is, the lithium oxide effectively acts in the manufacture of porcelain articles by crystallizing glass materials and if in the compositions containing the above nucleating agent and lithium oxide without nucleus, these are substituted by the other alkalis, such as sodium oxide or potassium oxide, crystallized porcelain can never be obtained. On the other hand, lithium oxide can not be produced abundantly and the place of production is limited so that it is very expensive.

According to the invention, expensive material such as lithium oxide is not used and sodium oxide or blast furnace slag which is very inexpensive material is taken as the alkaline source and 1 to 5% of zinc sulfide or equivalent amount of zinc oxide and sulfur are added to the glass composition containing as essential ingredients calcium oxide, magnesium oxide, aluminum oxide and silica, and the mixture is fused in the reducing atmosphere without decomposing zinc sulfide etc. to form a glass composition and then the product is reheated to a temperature of 900 to 1,000° C., thereby producing white colored porcelain articles having fine crystal structure and high strength.

When using sulfide as in the invention, care should be taken that silica and lime stone and the like raw materials used for making glass contains substantial amount of iron which combines with sulfur or mixed sulfur produced in case of decomposition of sulfide, thereby producing iron sulfide which is liable to color glass and crystallized articles. The combining ability of zinc with sulfur is much stronger than that of iron and sulfur and iron sulfides can not be produced unless there exists more than equivalent or stoichiometric amount of sulfur with zinc so that ferrous iron is produced without coloration. When zinc sulfide is contained in a ratio of more than 4 parts to 100 parts of basic glass composition, even if there exists less than 0.3% of iron oxides ($Fe_2O_3$) the translucent white crystal of zinc sulfide includes iron sulfide crystal in case of crystallization resulting in white final crystallized products.

The iron sulfide contained in the present composition serves the effect of a crystal nucleus by itself and gives no adverse effects except coloring the final crystallized products and is considered rather to increase the strength of the crystallized product and to be effective for preventing softening during heat treatment.

On the contrary, by controlling the amount of zinc sulfide and iron sulfide in the composition the final product can be colored black, chocolate or grey without reducing the strength of the crystallized products and by reducing the degree of reduction, ferric iron is produced in the glass material to give blue green color.

Moreover, the glass materials having a composition according to the invention may be added with color former which develops colors under the reduced condition, such as cadmium sulfide, selenium sulfide, cobalt oxide to provide a crystallized product colored in yellow, red, green etc.

In order to obtain the crystallized products as required by the invention a special heat treatment is necessary which consists of raising the temperature from a temperature lower than the softening point of the glass products to the softening point at a rate of increasing temperature which does not cause break down of the product and maintaining a certain period at the softening point and then raising the temperature to 900 to 1,000° C. at a rate of less than 200° C./hr. to crystallize. The holding time at the softening point and the rate of raising the temperature depend on the glass composition and the softening tendency is less as the content of calcium oxide and magnesium oxide is larger so that the heat treatment can be effected quickly without holding the temperature for a long time at the softening point.

A suitable quantity of zinc sulfide for obtaining preferable crystallized products is within the range of 1 to 5%. At less than 1% the crystal shows coarse grain and does not give a sufficient strength and at more than 5% the excessive zinc sulfide has no special effect for producing the crystallized product and it rather produces zinc oxide by the decomposition of zinc sulfide so that it is dangerous to increase the softening tendency during the heat treatment.

The standard glass materials to be used in the invention has the following compositions: and such composition must occupy more than 90% of the total composition.

(1) Basic glass composition:

| | Percent |
|---|---|
| $SiO_2$ | 40–70 |
| $Al_2O_3$ | 5–12 |
| One or more of CaO, MgO | 20–38 |
| $Na_2O$ | 3–8 |
| F | 0–2 |

(2) Nucleating agent: ZnS or a mixture of ZnO and S 1 to 5% of the glass composition.
(3) Reducing agent: No special reducing agent is necessary within a strong reducing atmosphere, but in the neutral atmosphere it is necessary to add 0 to 3% sulfur.
(4) Coloring agent: CdS, Se and CoO and the like coloring agents may be added.
(5) Fusing temperature is suitable between 1,400 to 1,500° C.
(6) Heat treatment: The heat treatment depends on the compositions of glass, yet in general the temperature can be raised at a rate of increasing temperature up to the softening point of glass not to break the glass products and the temperature is maintained at the softening point for 0 to 6 hours and afterwards the temperature is raised at the rate of less than 200° C./hr. up to 900 to 1,000° C. and maintained at the temperature for 0.4 to 4 hours until the crystallization is completed.

The glass material of such composition containing a large amount of CaO and MgO crystallizes at a shorter holding time and at a quicker rate of temperature rise without softening, but in the glass material containing a large amount of $Na_2O$ and $Al_2O_3$ it is necessary to subject the composition to low temperature heat treatment for a long period in order to prevent softening.

The reason why the range of compositions of the basic glass materials is limited as above by the invention is based on the following reasons:

CaO and MgO have a similar effect in the crystallization of glass of the invention so that it is not separated and defined to add together for 20 to 38% in total. Whether the crystallized glass can be manufactured or not by the composition of the invention depends on the total amount of CaO+MgO and if the amount is less than 20% the glass would never crystallize even by selecting the other compositions in any way and 38% of CaO+MgO is the limiting amount in which the glass of the invention can be subjected to shaping operation. In other words, at more than 38% of CaO+MgO the glass piece made by quenching can crystallize, but a shaped product can never be manufactured from such a glass. This tendency becomes more severe in the glass containing larger quantity of CaO than MgO and a glass containing less than 5% of MgO can never be shaped if the glass contains more than 30% of CaO. On the other hand, when the content of MgO is more than 20% the content of CaO up to 18% allows shaping of simple form. If the crystallized glass means merely the fine crystallization of glass the ultimate range of CaO+MgO will be further extended and the ultimate limit up to 38% of CaO+MgO may be allowed so far as an article can be manufactured by using a certain mold. The moldable range of glass is not only determined by the composition of glass but it depends on the skill of workmen and also the characteristics of the shaping machine.

Figure 2:
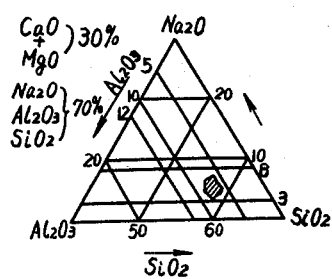
Figure 3:
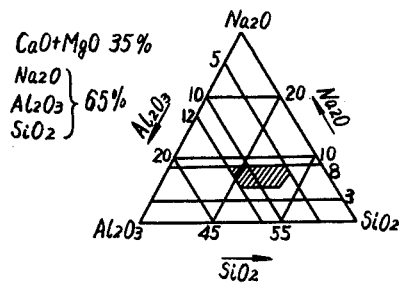

The preferable range of compositions are shown more explicitly in the accompanying diagrams, in which FIGS. 1, 2 and 3 illustrate three examples of glass compositions embodying the invention, which are self-evident without further explanation.

$Na_2O$, $Al_2O_3$ and $SiO_2$ are added to the total amount of CaO+MgO 20%, 30% and 35% respectively. The compositions within the above range easily crystallize.

An addition of fluorine is effective for preventing the softening in case of heat treatment and more particularly for a composition containing less CaO+MgO, but the addition of more than 2% fluorine is not preferable since the luster on the surface of the crystallized porcelain is lost.

The following examples show the invention in detail:

The crystallized porcelain glass manufactured by the invention has the following merits:

(1) It is much more inexpensive than the conventional crystallized porcelain since no lithium oxide is used and the addition quantity of zinc is about 1 to 5% and moreover, a very cheap material such as blast furnace slag can be used as the raw material.
(2) The shaping can be carried out in the similar manner as the molding process of glass so that pretty complicated articles can be manufactured with substantial accuracy and it enables easy production of the complicated articles more easily than the manufacturing method of ordinary porcelain articles.
(3) The flexural strength of the product is within the range of 700 to 2,800 kg./cm.² which is higher than that of ordinary porcelains (flexural strength of which is from 700 to 1,000 kg./cm.²) and a much stronger product can be obtained by a suitable selection of the composition and the condition of heat treatment.
(4) The material can be compounded with the other material easily so that various kinds of excellent compound articles can be manufactured.

The blast furnace slag has the following compositions:

| | Percent |
|---|---|
| $SiO_2$ | 30–34 |
| $Al_2O_3$ | 14–18 |
| FeO | Less than 1 |
| MnO | 0.8–1.5 |
| CaO | 39–42 |
| MgO | 2–5 |
| $K_2O$ | 0.5–1.0 |
| $Na_2O$ | 0.5–1.0 |
| S | 0.9–1.2 |
| $TiO_2$ | 0–2 |

As apparent from the above the blast furnace slag satisfies substantially the glass composition of the starting material of the invention so that the slag can be used as a part of the starting material for at least 25% thereof so that the cost of the product can be substantially reduced. When the blast furnace slag is used as part of the starting material the product is colored black, yet it can be discolored by adding ZnS according to the invention so that grey or white colored porcelain articles having high strength can be obtained at a low cost.

The preferable compositions of the basic glass when using blast furnace slag are as follows:

| | Percent |
|---|---|
| $SiO_2$ | 40–70 |
| $Al_2O_3$ | 5–12 |
| CaO+MgO | 20–38 |
| $Na_2O$ | 3–8 |
| F | 0–2 |

To the standard glass composition as above described 1 to 5% of ZnS is added and melted and the article thus obtained is subjected to heat treatment, to provide porcelain articles.

When the blast furnace slag is used the following im-

| Example | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 56.7 | 56.7 | 56.7 | 50.0 | 70 | 69.8 | 69.0 | 58.7 | 57.5 | 57.0 | 51.9 | 51.0 | 45.0 |
| $Al_2O_3$ | 6.8 | 6.8 | 6.8 | 6.8 | 6.0 | 6.0 | 5.0 | 6.8 | 8.5 | 6.8 | 7.5 | 6.0 | 12.0 |
| CaO | 24.6 | 24.6 | 28.6 | 17.6 | 17.5 | 17.5 | 17.5 | 24.0 | 24.0 | 20.0 | 22.0 | 22.0 | 25.0 |
| MgO | 6.3 | 6.3 | 2.3 | 20.0 | 2.5 | 2.5 | 2.5 | 6.0 | 6.0 | 10.0 | 13.0 | 13.0 | 10.0 |
| $Na_2O$ | 5.6 | 5.6 | 5.6 | 5.6 | 3.0 | 4.2 | 6.0 | 4.5 | 4.0 | 6.2 | 5.6 | 8.0 | 8.0 |
| ZnS | 1.0 | | | 4.0 | | | | | | | | | |
| ZnO | | 3.34 | | | 3.34 | 3.34 | 3.34 | 3.34 | 3.34 | 3.34 | 3.34 | 3.34 | 3.34 |
| S | | 1.0 | 3.32 | | 3.32 | 3.32 | 3.32 | 3.32 | 3.32 | 3.32 | 3.32 | 3.32 | 3.32 |
| Heat-treatment, °C | ¹700 ²900 | ¹700 ²900 | ¹700 ²950 | ²730 ²1,000 | ²1,000 | ²1,000 | ²1,000 | ²1,000 | ²1,000 | ²1,000 | ²1,000 | ²1,000 | ²1,000 |
| Thermal Expansion Coefficient×10⁻⁷ (25–300° C.) | 70 | 78 | 83 | 70 | 70 | 70 | 73 | 78 | 75 | 76 | 76 | 80 | 83 |
| Softening Point, °C | >1,000 | >1,000 | >1,000 | >1,000 | >1,000 | >1,000 | >1,000 | >1,000 | >1,000 | >1,000 | >1,000 | >1,000 | >1,000 |
| Flexural Strength, kg./cm.² | 2,760 | 2,050 | 1,300 | 1,350 | 800 | 850 | 750 | 1,600 | 1,200 | 1,000 | 2,080 | 1,300 | 1,000 |
| Knoop Hardness | 720 | 700 | 800 | 750 | | | | | | | | | |

¹ 3 hrs.   ² 1 hr.

purities inevitably enter into the product, but they are not harmful within such range, and they form FeS and MnS which act as nucleating agent in case of crystallization:

| MnO | FeO | S | $TiO_2$ |
|---|---|---|---|
| 0–1% | 0–1% | 0–2% | 0–3% |

When the blast furnace slag is used as a part of the starting material according to the invention zinc sulfide has another useful effect. Besides acting as a nucleating agent, it crystallizes containing MnS and FeS which are coloring compositions in the glass in case of heat treatment and produce zinc sulfide crystal which is white and opaque and considered to give final white color to the product. Accordingly, by regulating the quantity of zinc sulfide to be crystallized the color of the product can be controlled from black to white as desired.

When the blast furnace slag is used as a part of raw material the results are shown in the following examples.

| Example | 1 | 2 |
|---|---|---|
| Blast furnace slag | 38.5 | 38.5 |
| $SiO_2$ | 43.5 | 43.5 |
| CaO | 8.7 | 8.7 |
| MgO | 4.0 | 4.0 |
| $Na_2O$ | 5.3 | 5.3 |
| NaF | 2.0 | 2.0 |
| ZnS | 2.0 | 4.0 |
| Heat Treatment | 700° C. 1.4 hrs. / 1,000° C. 1 hr. | 700° C. 3 hrs. 1,000° C. 1 hr. |
| Color | Grey | White |
| Thermal expansion coefficient (25–325° C.) | 70×10⁻⁷ | 64×10⁻⁷ |
| Softening point | 1,000° C | 1,000° C |
| Flexural strength (kg./cm.²) | 2,640 | 1,650 |
| Hardness (Knoop) | 800 | 750 |

What we claim is:

1. A method of manufacturing porcelain articles by crystallizing glass materials which comprises the steps of preparing a mixture of compositions containing 40 to 70% of $SiO_2$, 5 to 12% of $Al_2O_3$, 20 to 38% of oxide selected from the group consisting of CaO and MgO, 3 to 8% of $Na_2O$ and 0 to 2% of F as the basic composition and added with 1 to 5% of ZnS in the form selected from the group consisting of ZnS and a mixture of ZnO and S as nucleating agent and 0 to 3% of reducing agent and some coloring agents, in which the total amount of the basic composition comprises at least 90% of the total glass material, fusing said mixture in reducing atmosphere, shaping to a desired article and subjecting said article to heat treatment by raising the temperature to a point lower than the softening point of the glass and maintaining that temperature for less than 6 hours and then raising the temperature at the rate of less than 200° C./hr. up to 900 to 1000° C. and maintaining the temperature for less than 4 hours to completely crystallize the glass, thereby producing ceramic.

2. A method of manufacturing porcelain articles by crystallizing the glass materials according to claim 1 which comprises the steps of using blast furnace slag as a part of the main starting material wherein the blast furnace slag has the composition of 40 to 70% of $SiO_2$, 5 to 12% of $Al_2O_3$, 20 to 38% of an oxide selected from the group consisting of CaO and MgO, 3 to 8% of $Na_2O$ and 0 to 2% of elemental fluorine adding to said last mentioned composition 1 to 5% of ZnS in the form selected from the group consisting of zinc sulfide and a mixture of zinc oxide and sulfur, and fusing the mixture and shaping to a desired article and then subjecting the article to heat treatment to provide a complete article.

References Cited by the Examiner

UNITED STATES PATENTS 2,920,971 1/60 Stookey _____ 64—33 X
3,006,776 10/61 Chen _____ 65—33 X DONALL H. SYLVESTER, *Primary Examiner.*

UNITED STATES PATENT OFFICE
CERTIFICATE OF CORRECTION

Patent No. 3,170,780                        February 23, 1965

Toshio Takehara et al.

It is hereby certified that error appears in the above numbered patent requiring correction and that the said Letters Patent should read as corrected below.

Column 1, line 37, for "$LiO_2$" read -- $Li_2O$ --.

Signed and sealed this 21st day of September 1965.

(SEAL)
Attest:

ERNEST W. SWIDER                      EDWARD J. BRENNER
Attesting Officer                       Commissioner of Patents